United States Patent
Lin et al.

(10) Patent No.: US 7,411,920 B2
(45) Date of Patent: Aug. 12, 2008

(54) METHOD FOR TRANSMITTING FRAMES IN A WIRELESS LOCAL AREA NETWORK

(75) Inventors: Ying-Chien Lin, Hsinchu (TW); Chi-Chih Kuo, Bau-Shan Hsiang (TW)

(73) Assignee: Infineon Technologies Taiwan Co., Ltd., Hsinchu (TW)

( * ) Notice: Subject to any disclaimer, the term of this patent is extended or adjusted under 35 U.S.C. 154(b) by 196 days.

(21) Appl. No.: 10/775,882

(22) Filed: Feb. 10, 2004

(65) Prior Publication Data

US 2004/0196819 A1  Oct. 7, 2004

(30) Foreign Application Priority Data

Apr. 4, 2003  (TW) .............................. 92107843 A

(51) Int. Cl.
*H04B 7/14* (2006.01)
*H04J 1/10* (2006.01)
*H04J 3/08* (2006.01)
*H04J 3/24* (2006.01)
*H04Q 7/24* (2006.01)
*H04L 12/28* (2006.01)
*H04L 12/56* (2006.01)

(52) U.S. Cl. .................. 370/315; 370/338; 370/401
(58) Field of Classification Search ................ 370/389, 370/400, 401, 474, 315, 338
See application file for complete search history.

(56) References Cited

U.S. PATENT DOCUMENTS 6,366,561 B1 * 4/2002 Bender ..................... 370/238
2005/0135422 A1 * 6/2005 Yeh ........................... 370/474

* cited by examiner

*Primary Examiner*—Kevin C Harper
(74) *Attorney, Agent, or Firm*—Seyfarth Shaw LLP

(57) ABSTRACT

On the case of receiving data frame from a station, the method of the present invention instructs the repeater to replace the content of the receiver address field by the address of the bridge when receiving the frame transmitted from the station, and then forwards the frames to the bridge. On the case of receiving a data frame transmitted from the bridge, the repeater can replace the content of transmitter address field by the address of the repeater itself, and then forwards the data frame to the station.

6 Claims, 4 Drawing Sheets

| To DS | From DS | Address 1 | Address 2 | Address 3 | Address 4 | Data |

FIG. 1 (Background Art)

| To DS | From DS | Address 1 | Address 2 | Address 3 | Address 4 | Data |
| 1 | 0 | BSSID | SA | DA | N/A | ...... |

| To DS | From DS | Address 1 | Address 2 | Address 3 | Address 4 | Data |
| 1 | 1 | RA | TA | DA | SA | ...... |

| To DS | From DS | Address 1 | Address 2 | Address 3 | Address 4 | Data |
|---|---|---|---|---|---|---|
| 1 | 0 | BSSID | SA | DA | N/A | ...... |

| To DS | From DS | Address 1 | Address 2 | Address 3 | Address 4 | Data |
|---|---|---|---|---|---|---|
| 1 | 0 | BSSID | SA | DA | N/A | ...... |

| To DS | From DS | Address 1 | Address 2 | Address 3 | Address 4 | Data |
|---|---|---|---|---|---|---|
| 0 | 1 | DA | BSSID | SA | N/A | ...... |

| To DS | From DS | Address 1 | Address 2 | Address 3 | Address 4 | Data |
|---|---|---|---|---|---|---|
| 0 | 1 | DA | BSSID | SA | N/A | ...... |

METHOD FOR TRANSMITTING FRAMES IN A WIRELESS LOCAL AREA NETWORK

BACKGROUND OF THE INVENTION

1. Field of the Invention

The present invention relates to a method for transmitting frames in a wireless local area network and data structure for the same, and more particularly, to a method and data structure for a repeater in a wireless local area network to transmit frames according to the IEEE 802.11 protocol.

2. Description of the Related Art

The IEEE 802.11 defines the format of data frame for wireless local area network. FIG. 1 illustrates some important fields of a data frame defined in IEEE 802.11. The data frame includes four address fields for recording basic service set identifier (BSSID), source address (SA), destination address (DA), transmitter address (TA) and receiver address (RA).

The destination address can be a unique address or a broadcast address, which is the destination of the frame. The source address is the address of the station, which generates the frame. The transmitter address is the address of the station, which transmits the frame in wireless medium, and the transmitter is connected to an access point (AP) in a wireless distribution system. The receiver address is the address of the next station, which will receive the frame, and the receiver also connects to the access point in the wireless distribution system.

The access point can be a bridge or a repeater. The bridge is used to connect the wireless local area network and the local area network such as ether network for sharing the Internet source. The repeater transmits signal in a circuitous manner to overcome the obstacle of the building so as to elongate the communication distance. Each station decides whether to receive a frame according to the content of the address 1 field. A station will receive the frame if the content of the address 1 is the same as the address of the station itself, otherwise it will discard the frame. The receiver can transmit an acknowledgement frame to the address recorded in the address 2 field if necessary.

FIG. 2A illustrates some important fields of a data frame 10 transmitted from a source station to a repeater, and FIG. 2B illustrates some important fields of a data frame 12 forwarded to a bridge by the repeater. As shown in FIG. 2A and FIG. 2B, the repeater must transform the data frame 10 into data frame 12 before forwarding to the bridge. The logic value of the "To DS" field is set to 1 for indicating that the data frame 12 is transmitted to an access point (the bridge) of a distribution system, and the logic value of the "From DS" field is set to 1 for indicating that the data frame 12 is transmitted from an access point (the repeater). The address 1 field records the receiver address (the address of the bridge), the address 2 field records the transmitter address (the address of the repeater), the address 3 field records the destination address and the address 4 field records the source address.

After receiving the data frame 12, the bridge will transmit an acknowledgement frame to the repeater according the address recorded in the address 2 field of the data frame 12, and the repeater will transmit an acknowledgement frame to the source station according the address recorded in the address 2 field of the data frame 10. To transform the data frame 10 into data frame 12, the repeater must change the content of the "From DS" field, the address 1 field, the address 2 field, the address 3 field and the address 4 field. Additionally, the above-mentioned method is inconvenient to design and increases the cost, since the data frame 12, transmitted from the repeater to the bridge, completely uses 4 address fields to store the bridge address, the repeater address, the destination address and the source address, respectively.

The bridge must identify the type of the repeater before receiving data frame from or transmitting to the repeater. However, the repeater and the bridge made by different companies might use proprietary protocol to transmit or receive frames that increase the complexity for setting a bridge which does not conform to requirement of the market.

SUMMARY OF THE INVENTION

The object of the present invention is to provide a method for transmitting frames in a wireless local area network and data structure for the same, which allows a station and a bridge to transmit frames without concerning the forwarding process performed by a repeater.

In order to achieve the above-mentioned object, the present invention provides a method for transmitting frames in a wireless local area network and data structure for the same. The wireless local area network comprises repeater coupled to a station and a bridge. On the case of receiving data frame from a station, the repeater replaces the content of the receiver address field by the address of the bridge when receiving the frame transmitted from the station, and then forwards the frames to the bridge. On the case of receiving a data frame transmitted from the bridge, the repeater replaces the content of transmitter address field by the address of the repeater itself, and then forwards the data frame to the station.

Compared with the prior art, the present invention possesses the following advantages:

1. During the forwarding process, the basic service set identifier (the address of the access point) of the data frame is the only one field to be changed by the repeater according to the present invention. However, there are five fields of the data frame to be changed according to the prior art, respectively.
2. When the bridge is receiving a data frame, the data frame can be regarded as one transmitted directed from the source station, without concerning the forwarding process performed by the repeater.
3. When the bridge is transmitting a data frame, the data frame can be regarded as one transmitted directly to the destination station, without concerning the forwarding process performed by the repeater.
4. The repeater using the present invention is adaptable for the access point which conforms to the IEEE 802.11.

BRIEF DESCRIPTION OF THE DRAWINGS

Other objects and advantages of the present invention will become apparent upon reading the following description and upon reference to the accompanying drawings in which:

FIG. 1 illustrates some important fields of a data frame defined in IEEE 802.11;

FIG. 2A illustrates some important fields of a data frame transmitted from a source station to a repeater;

FIG. 2B illustrates some important fields of a data frame forwarded to a bridge by a repeater;

FIG. 4A illustrates some important fields of a data frame transmitted to a repeater by a station according to the present invention;

FIG. 4B illustrates some important fields of a data frame transmitted to a bridge by a repeater according to the present invention;

FIG. 5A illustrates some important fields of a data frame transmitted to a station by a bridge according to the present invention; and FIG. 5B illustrates some important fields of a data frame transmitted to a station by a repeater according to the present invention.

PREFERRED EMBODIMENT OF THE PRESENT INVENTION

Figure 3:
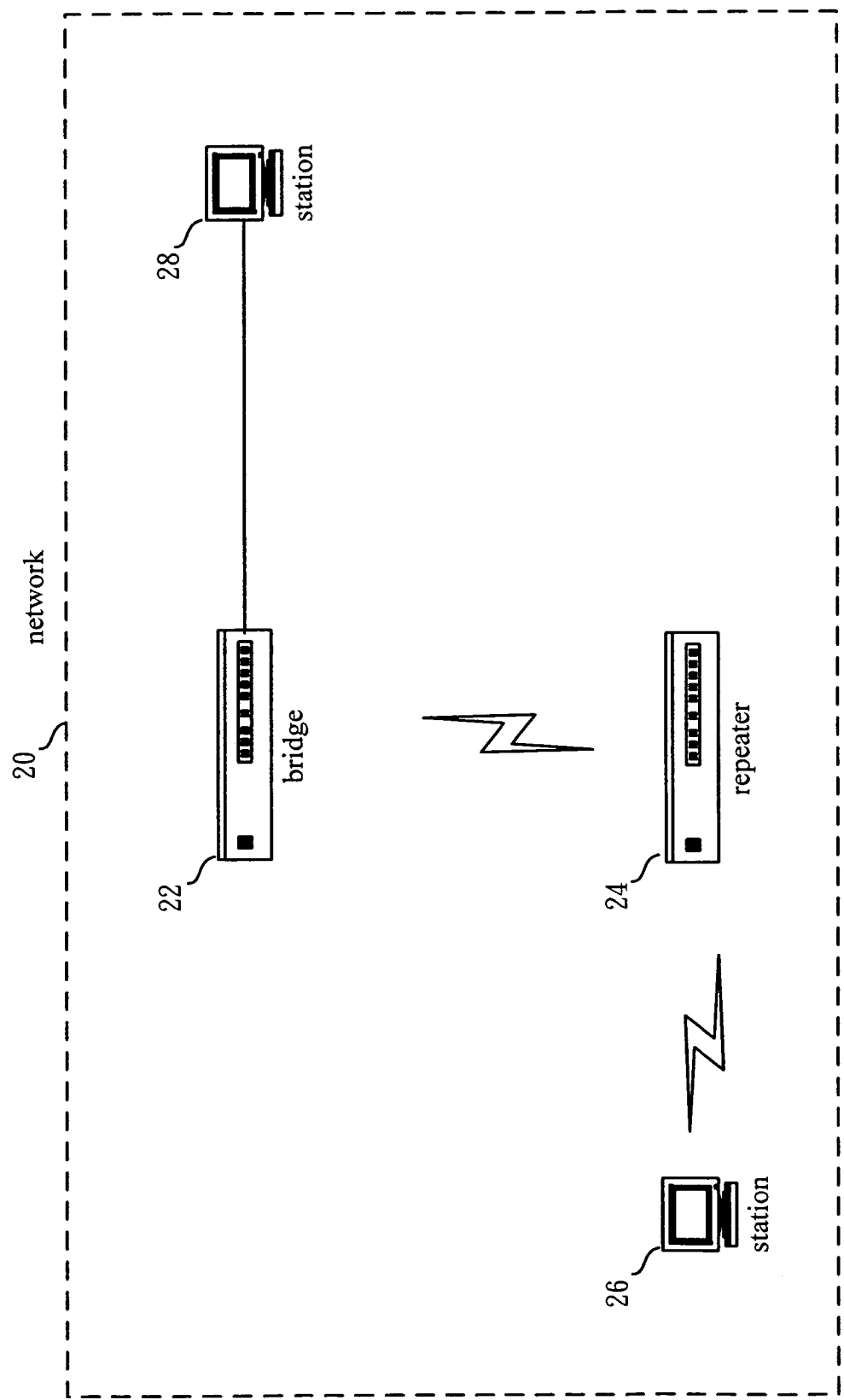
FIG. 3 is schematic diagram of a network.

FIG. 3 is a schematic diagram of a network 20. The network 20 comprises a bridge 22 (an access point), a repeater 24 (also an access point) wireless coupling with the bridge 22, a station 26 wireless coupling with the repeater 24 and a station 28 electrically connected the bridge 22. The station 26 belongs to the basic service set of the repeater 24, and the station 28 is a remote station connecting the bridge by the local area network/wide area network. When the station 26 needs to transmit a data to the station 28, the data will be added with a header to form a data frame that is then transmitted to the station 28 through repeater 24 and bridge 22.

FIG. 4A illustrates some important fields of data frame 40 transmitted to the repeater 24 by the station 26 according to the present invention. The logic value of the first field (the "To DS" field) is set to 1, indicating that the data frame 40 is transmitted to an access point (the repeater 24) of a distribution system. The logic value of the second field (the "From DS" field) is set to 0, indicating that the data frame 40 is not transmitted from an access point of a distribution system. The address 1 field records the BSSID of the repeater 24, the address 2 field records the address of the station 26, the address 3 field records the address of the station 28 and the address 4 field is not used. After receiving the data frame 40, the repeater 24 will transmit an acknowledgement frame to the station 26 according to the address recorded in the address 2 field of the data frame 40.

FIG. 4B illustrates some important fields of a data frame 42 transmitted to the bridge 22 by the repeater 24 according to the present invention. When receiving the data frame 40 from the station 26, the repeater 24 transforms the data frame 40 into data frame 42 by replacing the BSSID recorded in the address 1 field with the identifier of the bridge 22. As shown in FIG. 4B, the logic value of the first field and the second field is kept the same, the address 1 field for recording the receiver address is changed into the identifier of the bridge 22, the contents of the address 2 field and the address 3 field are kept the same and the address 4 field is still not used. When receiving the data frame 42, the bridge 22 will transmit an acknowledgement frame to the station 26 according to the address recorded in the address 2 field. Since the station 26 belongs to the basic service set of the repeater 24, the repeater 24 receives the acknowledgement frame instead of the station 26. However, the repeater 24 will not forward this acknowledgement frame to the station 26 since the repeater 24 had transmitted an acknowledgement frame to the station 26 when receiving the data frame 40 from the station 26 before.

Although the data frame 42 is transmitted from an access point (the repeater 24) to another access point (the bridge 22), the present invention method only changes the content of the address 1 field, and keeps all the other fields of the data frame the same. Besides, only three address fields are used to record the BSSID of the bridge 22, the address of the station 26 and the address of the station 28. Therefore, when the bridge 22 received the data frame 42, the data frame 42 can be regarded as one transmitted directly from the source station 26, not from the repeater 24. Besides, the bridge 22 also regards the acknowledgement frame as one transmitted directly to the station 26, not to the repeater 22.

FIG. 5A illustrates some important fields of a data frame 50 transmitted to the station 26 by the bridge 22 according to the present invention. The logic value of the first field is set to 0, indicating that the data frame 50 is not transmitted to an access point of a distribution system, and the logic value of the second field is set to 1, indicating that the data frame 50 is transmitted from an access point of a distribution system. The address 1 field records the destination address (the address of the station 26), the address 2 field records the BSSID of the bridge 22, the address 3 field records the source address (the address of the station 28) and the address 4 is not used. Since the address recorded in the address 1 field of the data frame 50 belongs to the basic service set of the repeater 24, the repeater 24 has to receive the data frame 50 instead of the station 26, and transmit an acknowledgement frame to the bridge 22.

FIG. 5B illustrates some important fields of a data frame 52 transmitted to the station 26 by the repeater 24 according to the present invention. After receiving the data frame 50 instead of the station 26, the repeater 24 will transform the data frame 50 into the data frame 52 by changing the content of the BSSID field into the identifier of the repeater 24, and then forward the data frame 52 to the station 26. The logic value of the first field and the second field is kept the same, the content of the address 2 field for recording the transmitter address has changed into the identifier of the repeater 24, address 1 field and the address 3 field are also kept the same and the address 4 field is still not used. After receiving the data frame 52, the station 26 will transmit an acknowledgement frame to the repeater 24 according the address recorded in the address 2 field.

Although the data frame 50 is transmitted from an access point (the bridge 22) to another access point (the repeater 24) of a distribution system, the bridge 22 transmits the data frame 50 with a format for transmitting to a station, not with a format for transmitting to an access point of a distribution system.

In other words, when the station 26 transmits a data frame to the bridge 22 through the repeater 24, the bridge 22 can regard the data frame as one transmitted directly from the station 26, not from the repeater 24. When the bridge 22 transmits a data frame to the station 26 through repeater 24, the bridge 22 can regard that the data frame is transmitted directly to the station 26, not forwarded by the repeater.

Compared with the prior art, a repeater using the present invention method for transmitting frames will possess the following advantages:

1. During the forwarding process, the basic service set identifier (the address of the access point) of the data frame is the only one field to be changed by the repeater according to the present invention. However, there are five fields of the data frame to be changed according to the prior art.
2. When the bridge is receiving a data frame, the data frame can be regarded as one transmitted directly from the source station, without concerning the forwarding process performed by the repeater.
3. When the bridge is transmitting a data frame, the data frame can be regarded as one transmitted directly to the destination station, without concerning the forwarding process performed by the repeater.
4. The repeater using the present invention is adaptable for the access point, which conforms to IEEE 802.11.

The above-described embodiments of the present invention are intended to be illustrative only. Numerous alternative embodiments may be devised by those skilled in the art without departing from the scope of the following claims.

What is claimed is:

1. A method for transmitting frames in a wireless local area network, a frame passing through a repeater and a bridge, the method comprising the steps of:
    transmitting a frame from a source station to the repeater, wherein the frame comprises a basic service set identifier field, a source address field and a destination address field;
    replacing the content of the basic service set identifier field by an identifier of the bridge while maintaining the content of the source address field and the destination address field; and
    transmitting the replaced frame wirelessly from the repeater to the bridge.

2. The method for transmitting frames in a wireless local area network of claim 1, wherein the repeater transmits an acknowledgement frame to the source station after receiving the frame transmitted from the source station.

3. The method for transmitting frames in a wireless local area network of claim 1, wherein the frame further comprises a first field and a second field, the first field is set to logic one for indicating that the frame is transmitted to a distribution system, and the second field is set to logic zero for indicating that the frame is not transmitted from a distribution system.

4. A method for transmitting frames in a wireless local area network, the wireless local area network comprising a repeater, a destination and a bridge, the method comprising:
    transmitting a frame wirelessly from the bridge to the repeater, wherein the frame comprises a destination field address, a basic service set identifier field and a source address field;
    replacing the content of the basic service set identified field by an identifier of the repeater while maintaining the content of the source address field and the destination address field; and
    transmitting the replaced frame from the repeater to the destination station.

5. A WLAN repeater comprising:
    wherein the WLAN repeater is configured to receive from a source station a first frame comprising a basic service set identifier field, a source address field and a destination address field,
    wherein the WLAN repeater is configured to replace in the first frame the content of the basic service set identifier field by an identifier of a bridge while maintaining the content of the source address field and the destination address field, and
    wherein the WLAN repeater is configured to transmit the replaced first frame wirelessly to a bridge.

6. The WLAN repeater of claim 5,
    wherein the WLAN repeater is configured to wirelessly receive from the bridge a second frame, the second frame comprising a destination address field, a basic set identifier field and a source address field,
    wherein the WLAN repeater is configured to replace in the second frame the content of the basic service set identifier field by an identifier of the repeater while maintaining the content of the source address field and the destination address field, and
    wherein the WLAN repeater is configured to transmit the replaced second frame to the destination station.

* * * * *